ELECTRON BEAM AMPLIFIERS AND OSCILLATORS

Filed June 21, 1963

INVENTOR,
BURTON J. UDELSON

BY Edward J. Kelly

United States Patent Office 3,229,220

Patented Jan. 11, 1966

3,229,220

ELECTRON BEAM AMPLIFIERS AND OSCILLATORS

Burton J. Udelson, Bethesda, Md., assignor to the United States of America as represented by the Secretary of the Army Filed June 21, 1963, Ser. No. 289,763
9 Claims. (Cl. 331—81)
(Granted under Title 35, U.S. Code (1952), sec. 266)

The invention described herein may be manufactured and used by or for the Government of the United States of America for governmental purposes without the payment to me of any royalty thereon.

This invention relates to microwave amplifiers, and more particularly to an extremely simple electron beam type microwave amplifier.

Briefly, the amplifier of this invention has, simply, two electron beam fast wave couplers, an input coupler and an output coupler. These couplers are similar to those commonly used in electron beam type parametric amplifiers, and may be either of the resonant type described in the patent to Carmon L. Cuccia, Patent No. 2,542,797, or may be of the distributed parameter type. However, unlike beam type parametric amplifiers, the amplifier of this invention requires no pumping section, neither RF nor D.C.

One object of this invention is to provide the novel microwave amplifier which is extremely simple to construct and is also very efficient in operation.

Another object of this invention is to provide a novel electron beam type microwave amplifier where the electron beam at the collector is substantially mono-energetic, allowing the beam to be collected by a depressed potential collector.

Still another object of this invention is to provide a novel electrostatically focused electron beam microwave amplifier, eliminating the need for a magnetic field.

These and other objects of this invention are achieved by placing two fast wave couplers, an input coupler and an output coupler, in close proximity to one another. With prior art fast wave couplers, when used in conjunction with parametric amplifiers, the input and output couplers were operated with the input frequency equal to the cyclotron frequency in the coupler. In accordance with the teachings of this invention, the new amplifier is operated with the input signal frequency different from the cyclotron frequency. The cyclotron and input frequencies are so adjusted that when the electron beam has a maximum transverse displacement as it leaves the input coupler, it will be near a plate having a maximum positive RF potential. The signal coupled onto the output coupler will be 180° out of phase with the signal on the input coupler so that the beam will experience a decelerating field due to the stray longitudinal field between the two couplers. This loss of longitudinal beam energy is converted into an amplification of the RF appearing at the output coupler.

The specific nature of the invention, as well as other objects, uses and advantages thereof, will clearly appear from the following description and from the accompanying drawings, in which.

Figure 1:
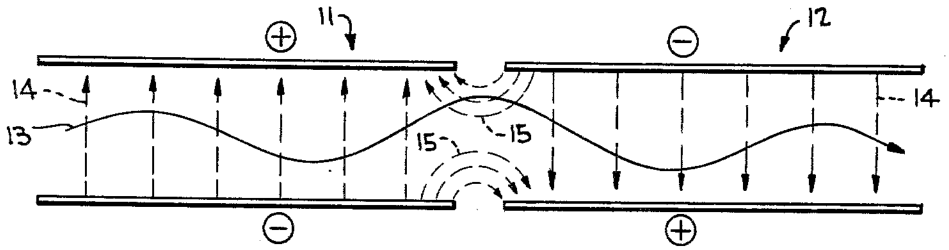
FIG. 1 is a sketch demonstrating the amplification mechanism of devices employing the teachings of this invention.

FIG. 1 represents an electron beam input coupler 11 and an electron beam output coupler 12. The coupler 11 couples signal energy on to an electron beam 13 and coupler 12 couples the signal energy out of the beam. The couplers 11 and 12 are resonant types such as those described in the Cuccia patent. The arrows 14 represent the instantaneous RF electric fields existing between the plates of the couplers, and reference numeral 15 represents the instantaneous electric fields existing between the couplers 11 and 12 themselves.

The basic mechanism of this invention, as will be developed in more detail subsequently, is that the couplers 11 and 12 are so designed that the electron beam 13 when it exits from the coupler 11 near a coupler plate, that plate will have a maximum positive potential. The RF signal on the output coupler 12 is 180° out of phase with respect to the input coupler 11, and if the spacing between the input coupler 11 and the output coupler 12 is small so that the transit times may be neglected, the electric field between the output coupler 12 and the input coupler 11 will always be in such a direction as to retard the laterally displaced electron beam 13. This condition is represented pictorially in FIG. 1. Since the electron beam 13 experiences a retarding field in going from input coupler 11 to output coupler 12, the loss of energy associated with the longitudinal velocity of the beam 13, results in an enhancement of the RF signal in the output coupler 12, providing an amplification of the input signal. The amplified signal is then transferred from the output coupler 12 to a load circuit.

A simplified equation for the approximate transverse position $x$ of an electron at the exit from the input coupler 11 is:

$$x=\frac{eEe^{j\omega t}}{m\omega_e^2}\left[\frac{-1}{2\sigma(1+\sigma/2)}+\frac{\cos(\sigma\phi)}{2\sigma}-\frac{\cos[(2+\sigma)\phi]}{4(1+\sigma/2)}+j\left\{\frac{-\sin(\sigma\phi)}{2\sigma}+\frac{\sin[(2+\sigma)\phi]}{4(1+\sigma/2)}\right\}\right] \quad (1)$$

where, $x$=the transverse distance of an electron beam away from the center axis, $Ee^{j\omega t}$=the input RF electric field, $e/m$=electron charge to mass ratio, $\omega_e$=radian cyclotron frequency, or natural resonant electron beam radian frequency, $$\sigma=\frac{\omega-\omega_e}{\omega_e}$$

$l$=length of coupler, $u$=average electron beam velocity, $\phi$=transit angle, $=\omega_e l/u$.

As can be seen from an inspection of Equation 1, the transverse $x$ and the phase of the electron beam displacement with respect to the input electric field E are functions of $\phi$ and $\sigma$. By making $\sigma$ negative and adjusting $\phi$ and $\sigma$ to values which correspond to a maximum positive value for the real component of Equation 1, and a value of the imaginary component close to zero, the conditions are met such that the electron beam 13, when it has a maximum displacement, will exit close to the plate having a maximum positive RF potential. The length of the plates of the input coupler 11 when the proper conditions are satisfied are:

$$l=\lambda_e/2\sigma \quad (2)$$

where, $\lambda_e$=the wavelength of the electron beam at its natural resonant frequency, $$0>\sigma>-1$$

and $$\frac{\sigma+2}{\sigma}=\text{an integer}$$

The output coupler 12 is similar in design to that of the input coupler 11. Since the gap between the input and output couplers is small, the entrance condition of the electron beam into the output coupler is the same as its exit condition from the input coupler. In the design of the output coupler, however, account must be taken of the fact that the average beam velocity, $u$, will be lower than in the input coupler because of the retarding effect of the inter-coupler field.

Figure 2:
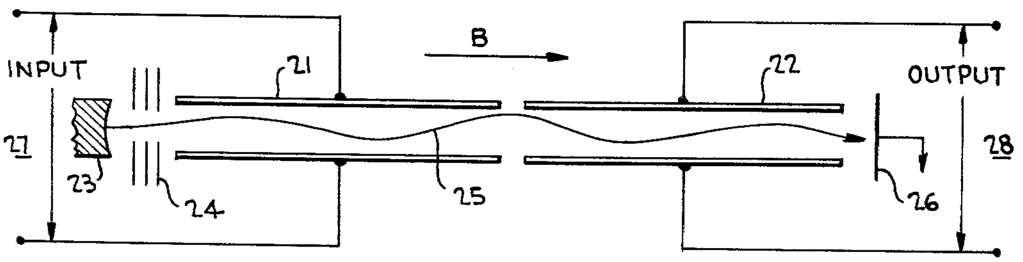
FIG. 2 shows pictorially a magnetically focused embodiment of this invention.

FIG. 2 shows a magnetically focused embodiment of this invention. Here there is shown a resonant input coupler 21, and a resonant output coupler 22. At one end of the amplifier, which is inclosed in an evacuated tube not shown, is an electron gun 23 with accelerating electrodes 24, which project an electron beam 25 between the plates that form the input and output couplers 21 and 22. After passing through the output coupler 22 the electron beam 25 is collected by a collector 26. The input signal which is to be amplified is applied in a push-pull manner at terminals 27, and the output is taken push-pull from terminals 28. In this embodiment, there is also provided a longitudinal magnetic force which is represented by the vector B produced by any suitable means, such as a solenoid or permanent magnet, not shown. The longitudinal magnetic field serves to focus the electrons in the beam 25, and also determines the cyclotron frequency of the electron beam.

As was developed in connection with FIG. 1, in order to achieve amplification with the magnetically focused device of FIG. 2, the device must be operated such that the electron beam cyclotron frequency $\omega_e$, determined by the strength of the magnetic focusing field, ($\omega_e = e/m\beta$) is greater than the input frequency $\omega$ in order that $\sigma$ of Equation 1 be made negative. Further, by making the length of the coupling plates 21, equal to $\lambda e/2\sigma$, this will ensure that when the electron beam 25 emerges from the input coupler 21 with a transverse displacement, it will always be displaced towards a plate of positive potential. In this manner the electron beam will undergo a retarding force due to the RF fields between the input coupler 21 and the output coupler 22, since the RF signal on the couplers are 180° out of phase with respect to one another. This retardation of the electrons in beam 25 causes a consequential amplification of the input signal applied at 27.

Figure 3:
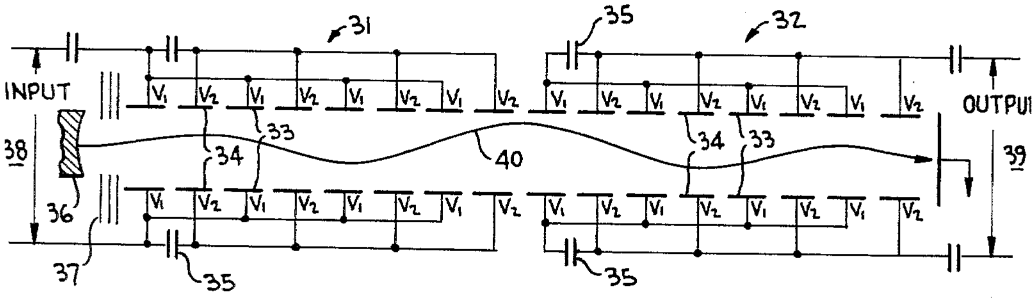
FIG. 3 represents an electrically focused embodiment of the present invention.

FIG. 3 shows an electrostatically focused embodiment of this invention similar in most respects to that shown and described in connection with FIG. 2. The advantage of the electrostatic focusing arrangement is the elimination of the need for a magnetic field, with resultant savings in weight and bulk.

In this embodiment there is an input coupler 31 and an output coupler 32, both of the electrostatically focused type. Each coupler is made up of a series of focusing plates 33 and 34, which are maintained at different D.C. potentials $V_1$ and $V_2$ as shown. The focusing plates 33 and 34 are maintained at the same RF potential, however, by means of capacitors 35. The couplers 31 and 32 are essentially the electrostatically focused counterpart of the magnetically focused resonant couplers shown in FIG. 2. The electrostatic couplers 31 and 32 are known in the art, and for a more detailed explanation of the mechanism of operation, reference may be had to my co-pending application Serial No. 207,130, filed July 2, 1962, entitled "Beam Focusing."

In addition to the couplers 31 and 32, the amplifier includes an electron gun 36, an accelerating electrode 37 and a collector. The entire device is housed in an evacuated envelope, not shown. The input signal is applied at 38 and the output signal is taken off at 39.

The natural resonant frequency (in megacycles) of the electron beam 40 in this electrostatically focused embodiment is given approximately by the equation:

$$\omega_e \approx \frac{0.3V_1}{S\sqrt{V_0}}$$

where, $S$=the periodicity of voltage variation (in meters), $V_1$=the amplitude of the periodic voltage component along the center plane of the coupler, $V_0$=the average D.C. voltage of the coupler elements 33–34.

As was the case in FIG. 2, the natural resonant frequency of the electron beam 40 in the coupler regions 31 and 32 must be adjusted to a value greater than the frequency of the input signal applied to 38. Further, the length of the coupler 31 must be made to equal $\lambda e/2\sigma$. Under these conditions, as was explained in connection with FIG. 1, the electron beam 35 will experience retarding force due to the instantaneous RF field between the input coupler 31 and the output coupler 32. The loss in longitudinal electron beam energy results in an amplification of the signal coupled to this electron beam in the input coupler, and an amplified signal is transferred to a load circuit by means of output coupler 32.

Figure 4:
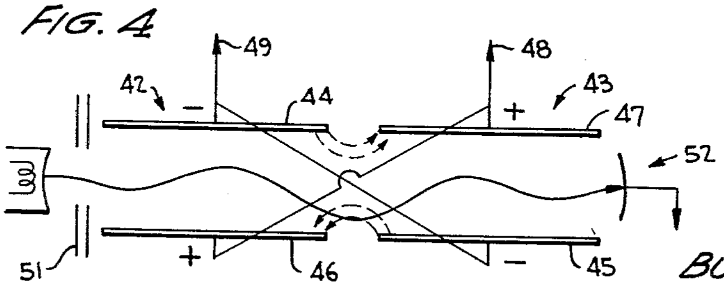
FIG. 4 shows the two adjacent fast-wave couplers of this invention connected to be operated as an oscillator.

FIG. 4 shows the principles of this invention as applied to an oscillator embodiment. The oscillator shown in FIG. 4 has two resonant type electron beam couplers 42 and 43. The couplers may either be of the magnetically focused type as shown in FIG. 3 or of the electrostatically focused type shown in FIG. 4. The couplers 42 and 43 are cross-coupled so that the upper plate 44 of coupler 42 is connected to the lower plate 45 of coupler 43. In the same manner plate 46 is coupled to plate 47. The output of the oscillator is obtained in a push-pull manner from terminals 48 and 49. In addition to the couplers 42 and 43, the oscillator also has an electron gun 51 and a collector 52, and is in an evacuated envelope, not shown. The couplers 42 and 43 are designed in accordance with Equations 1 and 2 developed in connection with FIGS. 2 and 3. The tube oscillates at that frequency which results in a positive value for the real component in Equation 1 and a value close to zero for the imaginary component. The oscillator may be tuned by varying the D.C. voltage on the couplers 42 and 43.

One method of improving the efficiency of the novel amplifier and oscillator described is to operate the collector with a negative potential with respect to the cathode. Under these circumstances, the beam will reenter the output coupler and traverse the couplers in the reverse direction. In this manner more longitudinal energy can be extracted from the beam as it traverses the gap between the couplers, since the returning beam will undergo essentially the same motion as the beam entering from the cathode.

It will be apparent that the embodiments shown are only exemplary and that various modifications can be made in connection and arrangement within the scope of the invention as defined in the appended claims.

I claim as my invention:

1. A high frequency electron beam device comprising:

(a) an electron gun and a collector longitudinally displaced therefrom, (b) a fast wave input coupler adjacent said electron gun and a fast wave output coupler adjacent said collector, said fast wave couplers being juxtaposed, and the transit time between couplers of an electron beam produced by said electron gun being small relative to a signal frequency, (c) each of said couplers including a pair of opposed, generally planar, parallel electron beam coupling structures, and said coupler adjacent said electron gun being designed that when said electron beam has its maximum transverse displacement the nearest electron gun coupler structure has a positive RF potential.

2. A high frequency electron beam device as in claim 1 wherein said input and output couplers are of the magnetically focused type.

3. A high frequency electron beam device as in claim 1 wherein said input and output couplers are of the electrostatically focused type.

4. A high frequency electron beam amplifier comprising:

(a) an electron gun and a collector longitudinally spaced therefrom, (b) an input fast wave coupler adjacent said electron gun and an output fast wave coupler adjacent said collector, said fast wave couplers being juxtaposed, with signal input means connected to said input coupler and signal output means connected to said output coupler, and the transit time between couplers of an electron beam produced by said electron gun being small relative to an input signal frequency, (c) each of said couplers including a pair of opposed, generally planar, parallel, electron beam coupling structures, the natural resonant frequency of said electron beam in said coupler region being less than the input signal frequency, and the length of said input coupler being such that when said electron beam has its maximum transverse displacement the nearest input coupler structure will have a maximum positive RF potential.

5. A high frequency electron beam device as in claim 4 wherein said input and output couplers are of the electrostatically focused type.

6. A high frequency electron beam device as in claim 4 wherein said input and output couplers are of the magnetically focused type.

7. A high frequency electron beam oscillator comprising:

(a) an electron gun and a collector longitudinally displaced therefrom, (b) a fast wave coupler adjacent said electron gun and a fast wave coupler adjacent said collector, said fast wave couplers being juxtaposed, and the transit time between couplers of an electron beam produced by said electron gun being small relative to a signal frequency, (c) each of said couplers including a pair of opposed, generally planar, parallel, electron beam coupling structures, and said coupler adjacent said electron gun being so designed that when said electron beam has a maximum transverse displacement the nearest electron gun coupler structure has a positive RF potential, (d) the upper electron gun coupler structure being connected to the lower collector coupler structure, and the lower electron gun coupler structure being connected to the upper collector coupler structure.

8. A high frequency electron beam oscillator as in claim 7 wherein said couplers are magnetically focused.

9. A high frequency electron beam oscillator as in claim 7 wherein said couplers are electrostatically focused.

References Cited by the Examiner

UNITED STATES PATENTS

| | | | |
|---|---|---|---|
| 2,407,297 | 9/1946 | Skellett | 331—81 |
| 2,414,121 | 1/1947 | Pierce | 315—39.3 X |
| 2,542,797 | 2/1951 | Cuccia | 332—58 |

ROY LAKE, *Primary Examiner.*

S. H. GRIMM, *Assistant Examiner.*